United States Patent [19]
Nishikawa

[11] 3,832,024
[45] Aug. 27, 1974

[54] ROTATION PREVENTIVE DEVICE

[75] Inventor: Hideo Nishikawa, Sakai, Japan

[73] Assignee: Wada Seiko Kabushiki Kaisha, Osaka, Japan

[22] Filed: Apr. 26, 1973

[21] Appl. No.: 354,884

Related U.S. Application Data

[62] Division of Ser. No. 234,083, March 13, 1972.

[52] U.S. Cl. ............................................. 308/236
[51] Int. Cl. ......................................... F16c 35/06
[58] Field of Search............... 308/236; 287/DIG. 8; 403/350

[56] References Cited
UNITED STATES PATENTS
1,178,926  4/1916  Judy........................................ 287/8

*Primary Examiner*—Charles J. Myhre
*Assistant Examiner*—Frank Susko
*Attorney, Agent, or Firm*—Wenderoth, Lind & Ponack

[57] ABSTRACT

A device for securing two members, one is a metallic product and the other a plastic product, so that they can not rotate relative to each other. In one embodiment a groove which is eccentric to the axis of the metallic product is provided on the outer cylindrical surface of the metallic product and the inner cylindrical surface of the plastic product is tightly fitted to the outer cylindrical surface of the metallic product in such a manner that a part of the inner cylindrical surface of the plastic product is filled in the groove. In another embodiment a groove which is eccentric to the axis of the metallic product is provided on the inner cylindrical surface of the metallic product and the outer cylindrical surface of the plastic product is tightly fitted to the inner cylindrical surface of the metallic product in such a manner that a part of the outer cylindrical surface of the plastic product is filled in the groove.

3 Claims, 6 Drawing Figures

ROTATION PREVENTIVE DEVICE

This is a division, of application Ser. No. 234,083 filed Mar. 13, 1972.

DESCRIPTION OF THE INVENTION

The present invention generally relates to a device for securing a metallic product to a synthetic resin (hereinafter referred to as plastic) product so that they can not rotate with respect to each other and more particularly to a device for securing either a metallic shaft or an outer race of a metallic bearing to a plastic product such as a plastic pulley, sprocket or gear, etc., and also for securing an outer race of a metallic bearing to a plastic support and further for securing a plastic shaft to an inner race of a metallic bearing.

Conventionally, in order to secure a plastic pulley or the like to the exterior of a metallic shaft, or in order to secure a plastic shaft to the interior of a metallic ring, a plurality of axial grooves have been cut on the exterior of the metallic shaft or on the interior of the ring to prevent rotation by the engagement of the grooves with those of the plastic members. However, the fewer the number of grooves, the deeper the cutting of such grooves and, the roots of the plastic members which are engaged with the grooves tend to be broken, while, when the number thereof is increased, the respective grooves become shallower, resulting in the reduction of the engaging function, whereby the rotation-preventing effect becomes uncertain. Also, the existence of the axial grooves causes an inconvenience in the polishing work.

An object of the present invention is to obtain a reliable rotation-preventing effect without cutting the conventional axial grooves.

A second object of the present invention is to cut the rotation preventing grooves in a circumferential direction so that the polishing of the outer and inner surface can be achieved as precisely as if there were no grooves.

A further object of the present invention is to provide in a circumferential direction the grooves with which the plastic members are to be engaged thereby to increase sufficiently the strength of the engaging part.

These and other objects and features of the present invention will become apparent from the following full description of the present invention taken in conjunction with preferred embodiments thereof with reference to the accompanying drawings, in which;

FIG. 3 is a longitudinal section side view showing a second preferred embodiment with the plastic pulley being fixed to the exterior side of a shaft;

Figure 1:
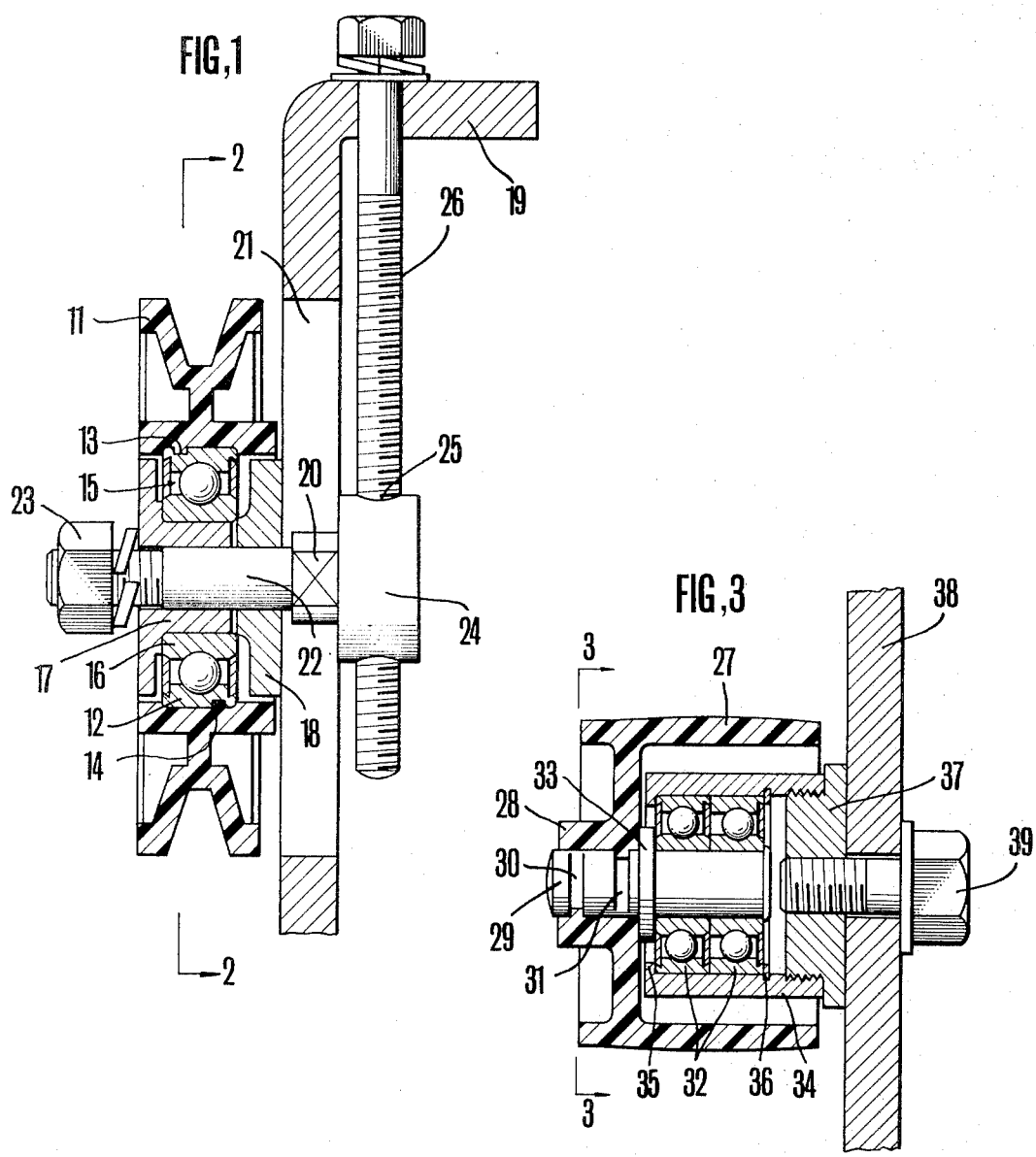
FIG. 1 is a longitudinal section side view showing a first preferred embodiment of the present invention with the outer race of ball bearings being secured to a plastic pulley.
Figure 2:
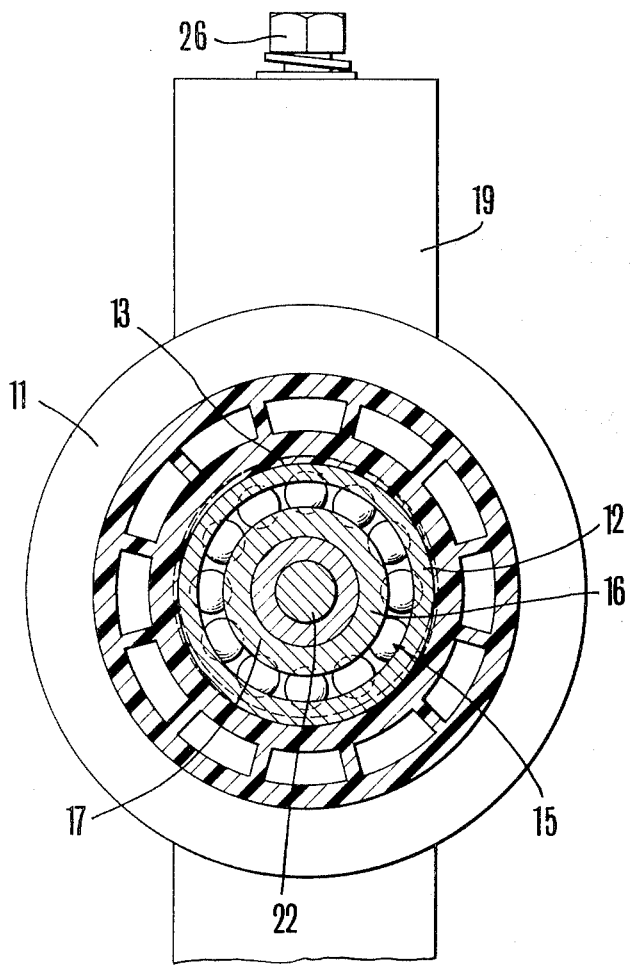
FIG. 2 is a cross-sectional view taken along a line 2—2 of FIG. 1.

Referring to FIGS. 1 and 2, a tension pulley 11 for a V-belt is made of plastic, the pulley 11 being fixedly secured to the metallic outer race 12 of the ball bearing 15. In this case, a pair of circumferential grooves 13 and 14, which are eccentric in opposing directions with respect to the axis of said race 12, are formed on the exterior circumference of the outer race 12. The ball bearing 15 having the circumferential grooves 13 and 14 provided on the exterior circumference of the outer race 12 is inserted in a pulley-shaped metal mold. And melted plastic material is injected into a cavity of the mold to mold the pulley 11, while the outer race 12 is inserted inside thereof.

By such a process as described hereinbefore, the outer race 12 is fixedly secured into the inner circumference of the pulley 11, and the plastic which constitutes the pulley 11 is filled in the eccentric grooves 13 and 14.

In the above-mentioned case, a bush 17 with a flange is engaged with the inner race 16 of the bearing 15 and a washer 18 is fitted on the opposite side of the bush 17. A sliding member 20 is mounted non-rotatably but slidably into a long hole 21 of a bracket 19. A bolt 22 provided integrally in the front portion of the sliding member 20 is inserted into the bush 17 and is clamped by means of a nut 23. A bolt 26 which is rotatably fitted into the bracket 19 is screwed into a tapped hole 25 of the rear portion member 24 of the sliding member 20 and the sliding member 20 can be slided by rotating the bolt 26 to adjust the tension of a V-belt (not shown) installed on the pulley 11. In this case, the sliding member 20, the bolt 22, the washer 18, the bush 17 and the inner race 16 will not rotate, but the pulley 11 may rotate together with the other race 12. Since a part of the inner circumference of the pulley 11 is engaged with the grooves 13 and 14 of the outer race 12 and the grooves 13 and 14 are eccentric with respect to the axis of the outer race 12, the pulley 11 and the outer race will not rotate with respect to each other. In addition, since the grooves 13 and 14 are gradually deepened and a projecting part of the inner surface of the pulley which is engaged with the grooves 13 and 14 becomes gradually higher and higher to cause the rotation force to act in a longitudinal direction of the projection, the strength of the projection is remarkably increased.

Figure 4:
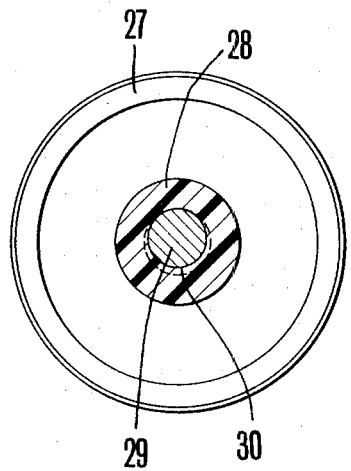
FIG. 4 is a cross-sectional view taken along a line 4—4 of FIG. 3.

The numeral 27 in FIGS. 3 and 4 is a plastic pulley for a flat belt. In this case, one end of a metallic shaft 29 is secured to the interior of a boss 28 of the pulley 27. Circumferential grooves 30 and 31, which are eccentric mutually in opposite directions, are formed on one end of the shaft 29. In this case, one end of the shaft 29 is inserted in a metal mold which forms the pulley 27 and melted plastic is injected into the mold, and thus a part of the plastic which constitutes the pulley 27 is filled in the grooves 30 and 31, whereby the shaft 29 and the pulley 27 are adapted not to be rotated with respect to each other.

The other end of the shaft 29 is fixed so that the inner race of a pair of ball bearings 32 will not rotate by pressure insertion. A collar 33 which separates the boss 28 and the bearings 32 is integrally formed on the approximately middle portion of the shaft 28. A metallic cylindrical cover 34 is put on the outer race of the bearings 32.

Figure 5:
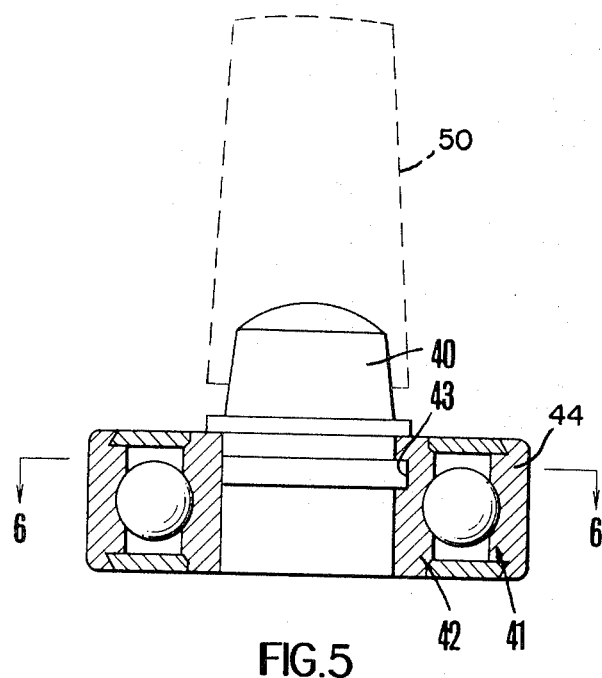
FIG. 5 is a longitudinal section side view showing a third preferred embodiment with a plastic shaft being secured to the inner race of the ball bearings.
Figure 6:
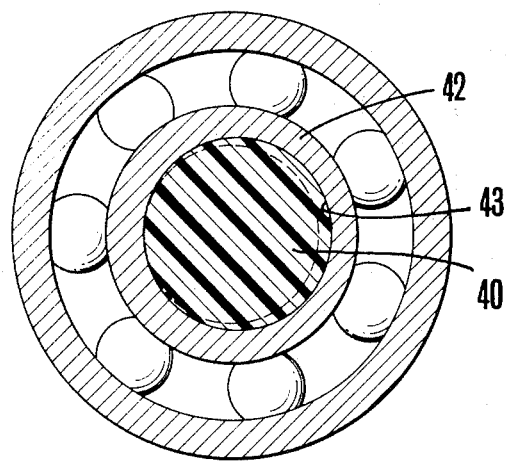
FIG. 6 is a cross-sectional view taken along a line 6—6 of FIG. 5.

The cover 34 has an internally folded flange 35 and a stop ring 36 is engaged with a groove formed on the inner circumference of the cover. The flange 35 and the stop ring 36 are adapted to prevent the bearings from moving axially. The numeral 37 is a cover screwed into the cover 34, numeral 38 a bracket, and numeral 39 a fixing bolt. The bolt 39 is inserted through a hole provided in the bracket 38 to screw into a tapped hole of the cover 37 thereby to secure the cover 37 on the bracket 38. In this case, when the pulley 27 is rotated by means of a flat belt (not shown) installed on the pulley 27, shaft 29 is adapted to rotate together with the pulley 27, and the outer race of the bearings 32. Referring to FIGS. 5 and 6, a shaft 40 is made of plastic. The numeral 41 is a ball bearing, and numeral 42 an inner race. A circumferential groove 43 which is eccentric with respect to the axis of the inner race 42 is provided on the inner circumference of the inner race 42. In this case, a metal mold which forms the shaft 40 is inserted in the inner race of the bearing 41, and the lower half portion of the shaft 40 fills up the inner race 42. Accordingly, a part of the lower half portion of the shaft 40 is engaged with the groove 43 thereby to serve as a rotation preventive device for the shaft 40 and the inner race 42. The outer race 44 of the bearing 41 is supported in a proper way, and a bobbin or a spool 50 can be mounted on the shaft 40 to rotate together with the shaft 40.

Although it is not shown in FIGS. 1 and 2, in the case that the outer race 12 of the bearing 15 as shown in FIGS. 1 and 2 is inserted into a plastic bracket instead of the pulley 11, the plastic bracket with the outer race 12 of the bearing secured therein can be obtained.

In the above-mentioned embodiments, since the eccentric grooves which are formed on the surface of the outer race or inner race of the bearings, or on the circumference of the shaft are arranged in parallel with a circumferential direction, namely, a rotating direction, accuracy will not be decreased if polishing is performed after the formation of the grooves.

In view of the fact that various changes and modifications of the present invention are apparent to those skilled in the art, they should be construed as included in the scope of the present invention unless otherwise departing from the true spirit and scope of the present invention.

I claim:

1. A pulley structure comprising a metallic rotary cylindrical outer member having at least one groove on the inner surface thereof, said at least one groove extending in the circumferential direction and being eccentric to the axis of said cylindrical outer member, and an inner cylindrical member of synthetic resin integrally molded on the inner surface of said outer cylindrical member, the plastic of said inner member filling the said at least one groove of said outer member, whereby said inner member is adapted to rotate with said grooved inner surface of outer member.

2. A pulley structure as claimed in claim 1 wherein said outer member comprises a bearing having an inner and outer race, the outer race of said bearing being fixed and said inner race having said at least one eccentric groove on the inner surface thereof.

3. A pulley structure as claimed in claim 1 wherein said at least one groove comprises two grooves formed so as to be oppositely eccentric to the axis of the outer rotary member.

* * * * *